United States Patent [19]
Claflin et al.

[11] Patent Number: 6,030,430
[45] Date of Patent: Feb. 29, 2000

[54] BLAST FURNACE WITH NARROWED TOP SECTION AND METHOD OF USING

[75] Inventors: H. Bruce Claflin, Upland; John Jasbinsek, Ontario, both of Calif.

[73] Assignees: Material Conversions, Inc., Ontario, Calif.; Improved Converters Inc., St. Peters, Mo.

[21] Appl. No.: 09/122,086

[22] Filed: Jul. 24, 1998

[51] Int. Cl.[7] .................................................. C21B 5/06
[52] U.S. Cl. ................... 75/380; 75/414; 75/434; 75/435; 75/958; 266/87; 266/197; 266/199
[58] Field of Search ............................ 75/380, 414, 434, 75/435, 958; 266/87, 197, 199

[56] References Cited

U.S. PATENT DOCUMENTS

| | | | |
|---|---|---|---|
| 2,952,533 | 9/1960 | Cuscoleca et al. | 75/463 |
| 3,623,717 | 11/1971 | Maloney et al. | 266/197 |
| 3,814,404 | 6/1974 | Claflin . | |
| 3,928,023 | 12/1975 | Claflin . | |
| 4,381,938 | 5/1983 | Claflin . | |
| 4,495,054 | 1/1985 | Claflin . | |

FOREIGN PATENT DOCUMENTS

| | | |
|---|---|---|
| 448603 | 3/1975 | Australia . |
| 85223 | 10/1973 | Belgium . |
| 1007854 | 4/1977 | Canada . |
| 993918 | 9/1975 | Italy . |
| 68503 | 12/1973 | Luxembourg . |
| 73/7527 | 9/1973 | South Africa . |
| 383531 | 6/1976 | Sweden . |
| 1308036 | 6/1984 | U.S.S.R. . |
| 1447404 | 8/1976 | United Kingdom . |
| 2091759 | 8/1982 | United Kingdom . |

*Primary Examiner*—Melvyn Andrews
*Attorney, Agent, or Firm*—Banner & Witcoff, Ltd.

[57] ABSTRACT

Described herein is an Improved Converter System designed to help reduce air, land and water pollution by completely converting materials that presently cause pollution into clean burning fuels and a host of other products beneficial to mankind. The primary conversion unit in the system is a zone controlled multipurpose slagging-ash oxygen jet blast converter. All incoming materials are passed through this process computer aided talented offspring of its two ancient prototypes the blast furnace and slagging-ash gas producers and the zone controlled blast furnaces described in U.S. Pat. Nos. 4,381,938, 4,495,054, 3,928,023 and 3,814,404. It employs two sets of tuyeres located in the bosh to input endothermic reacting gases, vapors and dusts through tuyere sets T1 and T2. A 100% oxygen jet blast is also input through tuyere set T2. Three sets of tuyeres in the stack are used to output finished products and by-products, T3, T4 and T5, zone control the stack temperature profile and remove recycling in the stack materials.

Incoming solid raw materials are charged in at the top and molten slag and metal are removed from near the bottom as in conventional blast furnace practice. As the burden descends it is completely converted by the precisely controlled as to temperature volume, and composition up moving gas stream. It is originated by combusting in the bosh a more central than conventional portion of the carbonaceous grate with the oxygen jet blast entering through tuyere set T2. It furnishes the heat required to completely convert the downmoving burden to a gas, vapor, molten slag, molten metal or dust. The portion of the gas withdrawn through tuyere set T3 just above the mantel in two modes of operation is an ideal boiler fuel or reducing gas as withdrawn. When it is combusted it produces only water, carbon dioxide and nitrogen, no harmful gases or chemical residues. All other by-products withdrawn or raw materials consumed in other units in the improved converter system producing finished products needed by mankind. Burning in the bosh a more central than conventional portion of the carbonaceous grate with the oxygen jet blast entering through tuyere set T2. It furnishes the heat required to completely convert the down moving burden to a gas, vapor, molten slag, molten metal or dust. The portion of the gas withdrawn through tuyere set T3 located in the stack just above the bosh is an ideal boiler fuel or reducing gas as withdrawn. When it is combusted it produces only water, carbon dioxide and nitrogen, no harmful gases or chemical residues.

20 Claims, 2 Drawing Sheets

BLAST FURNACE WITH NARROWED TOP SECTION AND METHOD OF USING

BACKGROUND OF THE INVENTION

This invention relates to an apparatus and method for efficiently converting a diverse material input into useful by-products and energy with a minimum of waste and pollution.

It has now been discovered how the design of mankind's two oldest large industrial tools, the blast furnace and the slagging-ash gas producer can be combined into that of a Zone Controlled Multi-Purpose Slagging-Ash Oxygen Jet Blast Converter (Improved Converter) which as the primary converter in an integrated closed loop, can help solve some universally urgent problems by directly or indirectly completely converting a wide range of materials, including in its four modes of operation: wastes, non-premium carbonaceous materials, oil shales and metallic oxides into desirable needed products. It has the best characteristics of both parents plus some attractive unique ones while minimizing undesirable characteristics.

Both parents since prehistoric times, even when their construction was crude, have been safely converting at high temperatures all the raw materials charged in at the top into molten metals and molten slags, gases, vapors and dusts, but conventional blast furnaces when they produce one ton of molten pig iron still produce approximately six tons of an inferior 70–90 Btu/cf. top gas. Further, today's large capacity blast furnaces function well only when charged with premium raw materials and the designs of conventional slagging-ash converters of all kinds being used have never been modernized to provide a method of precisely regulating the conversion activities taking place as the charge entering at the top moves down counterflow to the gas stream generated near the bottom by a mainly hot air blast.

There currently is a need for conversion systems that convert substantially 100% of all the input materials into desirable outputs. The health of the world is being increasingly threatened by air, water and land pollution related to the generation and disposition of wastes of many kinds by dumping, burying, incinerating, and releasing them into the air. Conversion residuals such as nitrogen oxides, hydrocarbons, sulfurous gases, and chemical compounds with a soluble toxic chemical content are polluting our air, land and water. Nature's live plant converters are being poisoned by the chemical content of acid rain and smog produced mainly when petroleum products and coals of all kinds are burned and the fumes released into the air. Commonly used high Btu content fuels are producing nitrous oxides which are especially dangerous because of their depleting effect on the ozone layer. Crude oil reserves are rapidly being depleted and employing atomic energy to produce electrical energy has created serious new pollution problems.

U.S. Pat. Nos. 3,814,404, 3,928,023, 4,381,938 and 4,495,054, all are incorporated herein by reference. They all introduced the concept of regulating activities within three temperature controlled zones in the blast furnace by installing strategically located auxiliary tuyeres (openings in the side of the furnace) through which gases and other materials can be injected or withdrawn. The basic objective, except in U.S. Pat. No. 4,495,054 was to produce molten metal from metallic oxide ores by employing less high temperature reducing gas generated internally from premium coke prepared externally from superior coals. U.S. Pat. No. 4,495,054 describes how a blast furnace can be improved into a zone controlled slagging-ash gas producer. It recognized the desirability of employing a 100% oxygen blast but described no method of protecting the gas producer's refractory walls from the high flame temperatures such a practice produces. U.S. Pat. No. 4,381,938 describes an improved blast furnace able to function as either a blast furnace or a slagging-ash gas producer.

This invention involves improvements on these zone control concepts in order to maximize performance of the blast furnace and achieve other desired results.

SUMMARY OF THE INVENTION

The present invention is directed to a converter, a blast furnace modernized in such a manner as to make it practical to safely and effectively continuously employ a 100% oxygen jet blast and be operated so as to consume, by conversion, a wide range of mostly non-premium raw materials including wastes of many kinds including a wide range of toxic and hazardous wastes, oil shales and sands and other inferior or difficult to process economically in an ecologically desirable manner raw materials. These are converted into fuel gases, molten metal, molten slag, vapors and dusts. Some conversion products are useable as produced and the balance are converted in the other production units in the system. A process control computer and auxiliary tuyere inputs and outputs are employed to precisely regulate the temperature controlled activities taking place in the three converter zones and the qualify of the outputs. Sensors are located at each of the five tuyere sets and at the top and bottom which are input to the process control computer. Gas samples are taken at tuyere sets T3, T4 and T5. These results are input to the process control computer giving it the information required to schedule periodic purges through the appropriate tuyere sets when an undesirable build up of recycling materials has occurred.

DESCRIPTION OF THE DRAWINGS

The invention is described by way of example in the following detailed description, taken in conjunction with the accompanying drawing, in which.

DESCRIPTION OF THE IMPROVED CONVERTER AND METHODS OF OPERATION

Figure 1:
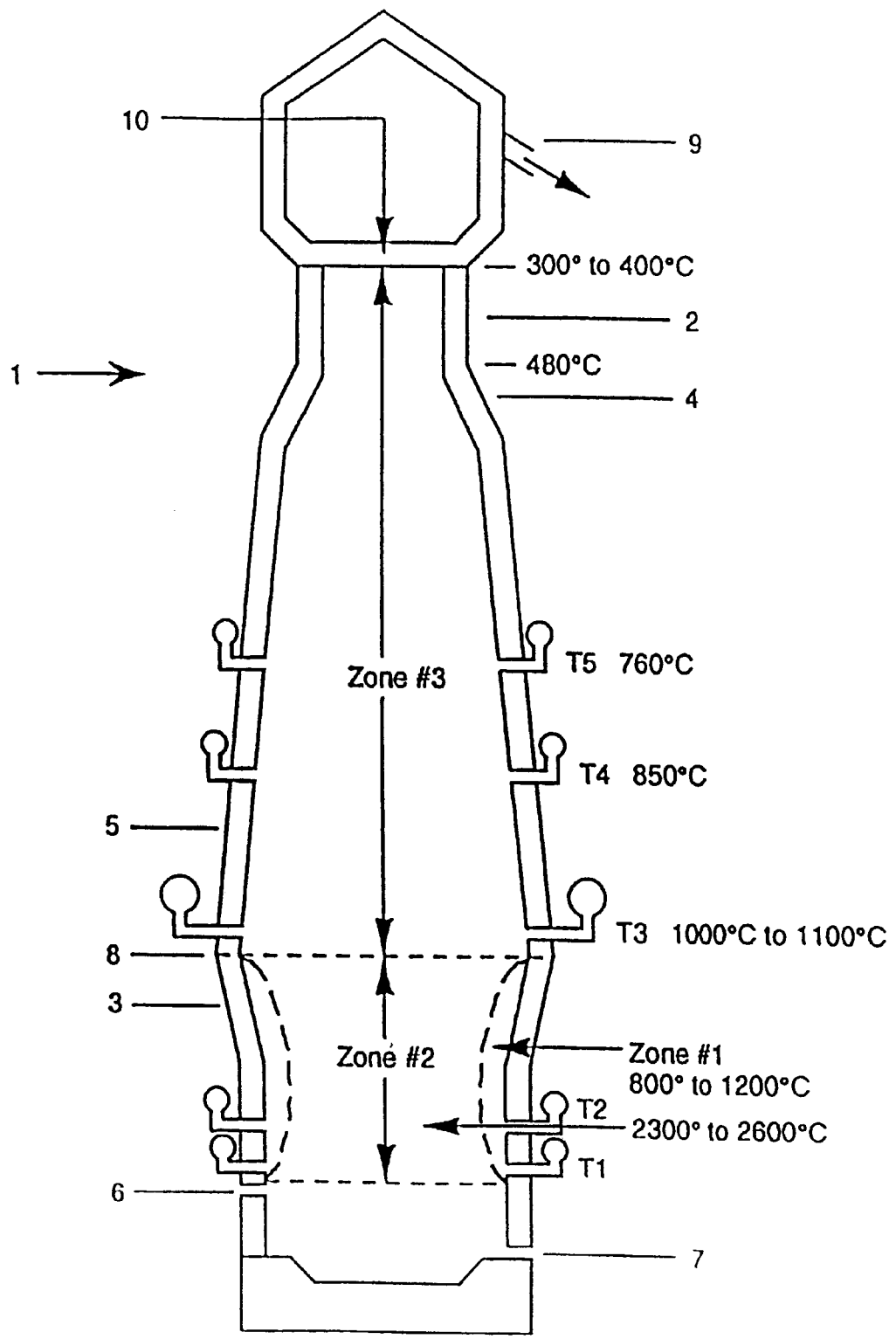
FIG. 1 is a schematic, cross-sectional view of the converter according to the invention.

The primary conversion unit in "Improved Converter Systems" will be a converter. The configuration almost identical to a modem blast furnace except for the following major improvements shown in FIG. 1, Conceptual Cross Section of converter. The largest diameter of the stack (at the interface between zone #2 and zone #3) is reduced approximately 25–30% in region 2, and in region 4 the stack 5, tapers from the conventional diameter to the reduced diameter. Region 4 extends from a point on the stack where temperature is controlled close to, but never above 480° C., where the stack starts to taper at the top of Region 4. Region 4 may extend from approximately 85% of the stack height above the bosh and to about 75% of the stack height above the bosh. This modification prevents oil shale or some carbonaceous grate forming materials, which swell as they are coked, from prematurely absorbing enough heat to begin expanding and creating a pinch point in this portion of the stack. The solid materials are charged at the top of the stack 10 as in conventional practice.

The five sets of tuyere sets are employed, so as to make it possible to create and more precisely control three distinct temperature zones of activity within the converter. Gases, vaporized materials, liquids and dusts are input through tuyere sets T1 and T2 in the bosh 3 in Zone #1 and withdrawn through three tuyere sets T3, T4, and T5 and the top 9. The tuyere openings are located at strategic points in such a manner as to achieve a more precise than conventional converter temperature profile and/or extract products. Sensing devices are installed at the top and all five tuyere sets and the crucible which are input converter temperatures at various heights to the process control computer along with the results of gas analyses of gas samples taken periodically at tuyere sets T3, T4, T5, and the top.

Zone #1 is formed by injecting a computer-calculated amount of gaseous, liquid, vaporized or dust like endothermic reacting materials such as steam, carbon dioxide, wastes in gaseous, liquid or dust forms, and hydrocarbons through an endothermic reacting material injection system placed in tuyere set T1 located below tuyere set T2. Tuyere set T2 is located where in conventional practice the hot air blast is introduced and is employed to introduce oxygen. It houses oxygen jet blast nozzles and a peripheral injection system for endothermic material. The injection pressure employed at T1 tuyere set is variable but always only slightly greater than that prevailing in the bosh. An annular gaseous flame buffer, Zone #1, is created in this manner in front of tuyere sets T1 and T2. It protects the refractory walls in this portion of Zone #2 from the high flame temperatures. The materials injected through tuyere set T1 tend to move up instead of into the center of the bosh.

Consuming the endothermic reacting peripheral content of the oxygen jet blast (which may be 100% oxygen) entering through the jet nozzles located in tuyere set T2, for a short distance prevents it from producing a high flame temperature as it races through Zone #1 at a pressure much above (eg: up to double) that prevailing in this portion of the converter. The much larger endothermic reacting input through tuyere set T1 is converted to $H_2$ and CO. The heat consumed by these endothermic reactions modifies the flame temperature in Zone #1 enough to protect the refractory walls, injection systems and tuyeres in this area from the high flame temperatures generated in Zone #2 in front of tuyere set T2.

Zone #2 is operated essentially as a high temperature process heat and reducing gas generation zone where the final conversion of the down moving burden to a gas, vapor, molten slag, or molten metal takes place. It includes all the bosh not in Zone #1. The oxygen consumption of the oxygen jet streams with their, peripheral, endothermic reacting content, is minimal when they pass through Zone #1. The streams mainly consume the carbonaceous grate in Zone 2 at high flame temperatures (2300°–2600° C.) which are conducive to the reactions $C+O_2=CO_2$ and $CO_2+C=2CO$ and $H_2O=H_2+\frac{1}{2}O_2$. These gases form the main ascending gas stream which to a degree is modified in temperature by the endothermic input from Zone #1 which is maintained within a 800°–1200° C. temperature range by regulating the endothermic reacting input through tuyere sets T1 and T2.

Zone #3 starts at the top of the mantel 8 and includes the entire stack. It is regulated through three tuyere sets. Tuyere set T3 is located just (eg: about 2 feet) above the mantel. The temperatures at this level are regulated by the volume of oxygen input through tuyere set T2 and or the endothermic reacting materials input through tuyere sets T1 and T2. Tuyere set T4 is located above the mantel approximately 25% of the distance between the mantel and the top of the stack. The temperature at Tuyere set T4 is maintained near 850° C. and the temperature of the transition section 4 at close to 480° C. at the top end by regulating the volumes of gas withdrawn through T3. Tuyere set T5 is located further up the stack (approximately 42% of the distance above the mantel) where the stack temperature is maintained near 760° C. by regulating the amount of gas withdrawn through tuyere sets T3 and T4. The temperature at the top of the stack is maintained between 300°–400° C. by regulating the volume of gas removed through tuyere T3, T4, T5 and the endothermic input through T1 and T2. The output 9 of a top gas collection system removes gaseous products of carbonization and/or volatilization, including carbon monoxide, hydrogen, hydrocarbons, hydrogen sulfide, oxides of sulfur, nitrogen, ammonium, light oils, and steam. The above locations as well as the location of the regions of the improved converter recited earlier generally can vary by 4% from the figure recited.

The coke and char constituents, which reform from above the carbonaceous grate consumed in Zone #2 (except in the high volume molten metal production mode), are internally manufactured in Zone #3 from non-premium coals and other carbonaceous materials charged at the top and move downward by gravity as the portion of the grate below them is gasified. Their temperature is controlled by regulating the amount of gas passed through the zone and its entering temperatures so that they are never lower than 1000° C. when they reach the bottom of Zone #3. In this way the traditional loss of sensible heat incurred when coke is produced outside of a blast furnace, then quenched and cooled before charging, is completely avoided, except when operating in the high molten metal production mode and then only partially.

A typical medium size conventional blast furnace produces 2,500–3,150 tons of hot metal (pig iron) while consuming 8,000–10,000 tons of solid charge consisting of iron bearing oxides, coke, and other additives. Source: *Blast Furnace—Theory and Practice,* Volume 1, Gordon and Breach Science Publishers, New York, London, Paris.

TABLE 1

| Blast-Furnace Dimensions | |
|---|---|
| Hearth Diameter | 29 ft 0 in |
| Bosh Diameter | 32 ft 5 in |
| Top Diameter | 22 ft 6 in |
| Bell Diameter | 16 ft 6 in |
| Hearth Bottom to Iron Notch | 2 ft 0 in |
| Iron Notch to Cinder Notch | 4 ft 8 in |
| Cinder Notch to Tuyeres | 3 ft 6 in |
| Tuyeres to Bend Line | 1 ft 4 in |
| Height of Bosh | 11 ft 0 in |
| Height of Vertical Section | 7 ft 0 in |
| *Height of Sloped Inwall | 58 ft 0 in |
| Bend Line to Hopper Ring | 22 ft 0 in |
| Total Height Iron Notch to Top Ring | 108 ft 0 in |
| Working Height (Centerline of Tuyeres to Stockline, −6 ft Below Large Bell Closed) | 82 ft 0 in |
| Working Volume | 51,500 cu ft |
| Bosh Angle | 81° 33' 22" |
| Inwall Batter | 1.03 In. Per. Ft. |
| No. of Tuyeres | 24 |
| No. of Columns | 8 |

*Calculated Taper of Sloped Inwall 1.02 in/ft

An improved converter of this invention can exhibit nearly the same dimensions as the referenced middle size conventional blast furnace with exceptions of 25–30% reduced diameter of 15% of the top stack height (ref. FIG. 1 Region 2) and an increased tapered stack in Region 4 comprising approximately 10% of the stack height which interconnects with the top reduced diameter of the stack and the stack of Region 5 exhibiting conventional constant tapper.

In addition to these modifications the improved converter employs five sets of tuyere sets strategically located in the hearth and the stack above the bosh. Improved converter dimensions and location of the tuyere sets can be as shown in Table 2.

TABLE 2

| | |
|---|---|
| Hearth Diameter | 27 ft 0 in |
| Bosh Diameter | 30 ft 6 in |
| Reduced Top Stack Diameter | 12 ft 0 in |
| Reduced Diameter Top Stack Height | 11 ft 6 in |
| Bottom Diameter of Tapered Stack Interconnection | 20 ft 0 in |
| Height of Tapered Stack Interconnection (Region 4) | 8 ft 0 in |
| Stack Interconnect Taper (Region 4) | 5.6 in/ft |
| Height of Bosh | 11 ft 0 in |
| Height of Vertical Section | 20 ft 0 in |
| Height of Stack with Constant Taper | 52 ft 0 in |
| Stack Constant Taper (Region 5) | 1.23 in/ft |
| Total Stack Height Top of the Bosh Top The Top Stack | 71 ft 0 in |
| Total Height Iron Cast Hole to Top Stack | 112 ft 0 in |
| Tuyere Set $T_1$ above Iron Casting Hole | 7 ft 6 in |
| Tuyere Set $T_2$ above Iron Casting Hole | 12 ft 0 in |
| Tuyere Set $T_3$ above Bosh | 2 ft 0 in |
| Tuyere Set $T_4$ above Bosh | 18 ft 0 in |
| Tuyere Set $T_5$ above Bosh | 29 ft 0 in |

Dimensions of conventional blast furnace and/or improved converter can vary with the installed capacity.

Converter System

By making the changes in the design of modem blast furnaces described herein, and illustrated in FIG. 1, it is practical to modernize them into converters able to operate effectively in four different modes depending on the major objectives sought. In two of the four modes they demonstrate their capacity as the primary converter in universal Improved Converter Systems designed to completely convert, in Mode #1, wastes of many kinds into desirable products and, in Mode #2, oil shales and oil sands completely into desirable products without causing pollution of any kind. In Mode #3, the converter functions as an improved slagging-ash gas producer designed to produce a maximum volume of low cost clean burning gases from non-premium carbonaceous raw material sources without causing pollution. In Mode #4 the converter functions without causing pollution, as an improved (less coke consumed, no stove costs, longer lining life) high volume molten metal producing blast furnace also simultaneously producing a superior gas removed out the top (280 to 300 Btu/cf.).

In all modes a high finished product yield is obtained by completely converting all incoming materials into a highly desirable boiler fuel gas, reducing gas to feed stock from which methanol is synthesized as withdrawn through tuyere set T3 with only minor processing, or into gases, molten metal and slag vapors, and dusts consumed in dependent production units in the fully integrated closed loop. The high flame temperatures used in the maximum temperature portion of Zone #2 produce enough high temperature heat to completely convert all input materials.

Figure 2:
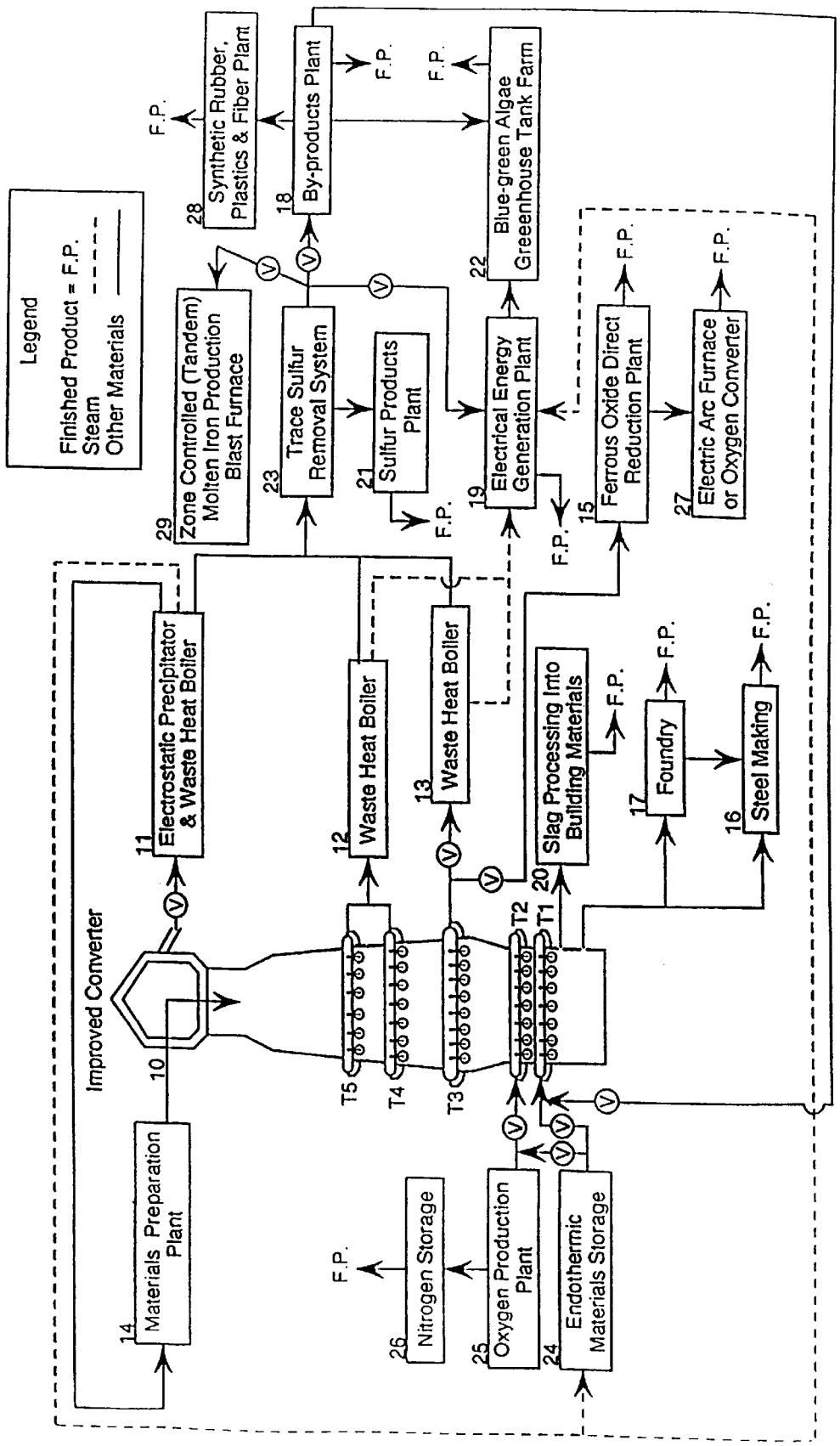
FIG. 2 is a flow diagram showing the "Improved Converter System" incorporating a converter according to the invention.

Some of the other products withdrawn at tuyere sets T4 and T5, the top and the slag notch 6 and casting hole 7 are finished products as withdrawn. Others can constitute raw materials streams to other production units in the integrated Improved Converter System where they are converted to finished products. Referring to FIG. 2, these production units include but are not limited to some combination of Waste Heat Boilers 11, 12, 13; a Ferrous Oxide Direct Reduction Plant 15; Steel Making Facilities 16; a Foundry 17; a By-products Plant 18; an Electrical Energy Generation Plant 19; a Processing into Building Materials unit 20; a Sulfur Products Plant 21 a synthetic polymer facility, such as a Synthetic Rubber or Fiber and Plastics Plant 28; a $CO_2$ rich atmosphere superior food strain of Blue-green Algae Greenhouse Tank Farm 22. Optionally another tandem operation converter 29 can be operated in the high molten metal production mode. Supporting units include Material Preparation Plant 14, Endothermic Materials Storage 24: Oxygen Production Plant 25 and Nitrogen Storage 26.

The by-products stream is converted in the By-products Plant 18 into a variety of products including, but not limited to: a clean-burning pipeline gas with a 400–600 Btu/cf. energy content; fertilizers; clean-burning fuels which will be ideal substitutes for gasoline, diesel fuel and jet propulsion fuel; a synthetic rubber, fiber and plastics products stream; industrial chemicals, and black top tar.

The Slag Processing unit 20 can produce, from the acidic slags, superior ingenuous rock castings, e.g., of an interlocking type suitable for use in residential construction and other structures of many kinds. They are fireproof, insectproof, require no maintenance, have excellent insulating qualities and facilitate rapid, low-cost construction. The basic slags, without remelting, can be converted into specification cements or rock wool insulation.

The Waste Heat Boilers 11, 12, 13 can produce steam; convert vaporous kerogen to a readily processed liquid which, in the By-products Plant, can be converted into substitutes for gasoline and other by-products; convert recycling metal vapors including sodium, potassium, and zinc to metallic dusts or droplets and also separate out NaCN and KCN. The Synthetic Rubber and Fiber Plant 28 can convert the incoming raw materials stream from the By-products Plant into a wide variety of synthetic rubber, plastics, and fiber products.

In all modes, except Mode #4, the high volume metal production mode, the molten metal periodically withdrawn from the casting hole 7 in the conventional manner will be delivered to the Foundry 17 where any necessary separation of the different metals takes place or delivered directly to the steel making facility.

To achieve the objectives set forth above, the converter has been designed and is operated in any of the four modes so as to handle a very large volume of diversified materials charged in at the top 10. An average size converter is able to process approximately 8,000 to 10,000 tons of material per day. The size of the chunks of material charged normally vary from a minimum of ¼" to a maximum of 8" in any one dimension.

When the major objective is disposal of wastes in an improved manner, the materials charged at 10 and those removed from the top 9, tuyere sets T3, T4 and T5, the molten slag notch 6 and the molten metal casting hole 7 are somewhat different from the input and outputs when the main objective is to convert oil shales into clean-burning fuels and many other beneficial products or convert non-premium carbonaceous materials into gases, or convert metallic oxide materials into molten metal. An essentially 100% oxygen jet blast is, however, employed in all modes of operation. It carries in with it a peripheral endothermic input as it is released through tuyere set T2 at a pressure high enough (eg: about double) above that prevailing in this bosh portion of the converter to make certain it passes rapidly through Zone #1 and penetrates deeply into Zone #2. The advantages of substituting a relatively high pressure 100% oxygen jet stream blast for the conventional hot air blast are to: (1) eliminate the need for blast heating stoves; (2) improve the movement of the burden down the stack by greatly reducing the ascending gas volume per 1$b$ of carbon consumed and by increasing the central portion of the carbonaceous grate consumed; (3) improve the quality of the gases produced by eliminating the nitrogen content introduced in the conventional hot air blast; (4) increase the generation of high-temperature sensible heat by safely using high flame temperatures, and, as a consequence the magnitude of endothermic reactions that are practical; (5) increase the operating rate. The gas continuously removed through tuyere set T3 and passing through the Waste Heat Boiler and the Trace Sulfur Removal System to remove vaporous materials will have a heat energy content of 280–300 Btu/cf., making it a high efficiency boiler fuel, superior even to natural gas because it burns with a lower flame temperature and, consequently, no harmful nitrogen oxides will be formed. This gas is also an ideal raw material gas for use in synthesizing methanol and other products because it is almost entirely free of air-poisoning sulfur compounds, hydrocarbons and nitrogen oxides formed when an air blast containing large amounts of nitrogen is employed.

Modes of Operation

When the major objective is to consume waste in an ideal manner, the charge at the top 10 can contain waste materials of many kinds, including municipal and industrial wastes such as tires, automotive wastes, pesticides, sludges of many kinds, waste oil, PCBs and other hazardous and toxic, organic and inorganic materials. Unsorted municipal waste typically contains up to 8% (national average) metallic content. Hagerty, D., Pavoni, J., Heer, J., Solid Waste Management, D. Van Nostrand Company, Inc., New York. Enough basic slag constituents conventionally are added to the charge entering through the top to produce the basic slag needed to remove the inorganic sulphur in the charge. To facilitate the production of specification cement clinker slag in the Slag Processing Into Building Materials Unit 20 chemical additions may be input into the more precisely controlled slag. The ratio of non-premium coal and other carbonaceous grate forming material charged per ton of wastes input will be relatively small, 0.25 to 0.7 because of the carbonaceous content of most wastes.

The following is a calculated example illustrating this process for the conversion of municipal and industrial wastes into clean fuel gases and a basic slag suitable for conversion into specification cement clinkers and other by-products:

TABLE 3

| CHARGE | | PRODUCT | | | |
|---|---|---|---|---|---|
| | lbs | | lbs | cf. | BTU/cf. |
| Multiple Solid Wastes | 1,400 | T4, T5 and Top Gas | 1,251 | 29,887 | 557 dry |
| Tires | 200 | T3 | 1,592 | 28,809 | 300 dry |
| Sludges | 100 | Tar | 53 | | |
| Toxic Wastes | 50 | Light Oil | 15 | | |
| Slag Building Materials | 250 | Pig Iron | 118 | | |
| Non-Premium Coal | 700 | Non-ferrous Metals | 52 | | |
| Commercial | 715 | Basic Slag | 667 | | |
| | | Water | 35 | | |

TABLE 3-continued

| CHARGE | | PRODUCT | | | |
|---|---|---|---|---|---|
| | lbs | | lbs | cf. | BTU/cf. |
| Oxygen | | Dust | 35 | | |
| Steam | 602 | | | | |
| TOTAL | 4,017 | TOTAL | 4,017 | | |

The noncarbonaceous content of the charge as it descends is converted by the ascending gas stream to gases, vapors or molten materials which trickle down through the carbonaceous grate. The metals (mostly molten iron) accumulate in the bottom of the hearth and a layer of slag forms on top of them. On their way down to the crucible the molten iron captures a maximum amount of the inorganic sulfur released when the carbonaceous grate is consumed in front of tuyere set T2. It releases most of it to the slag layer as it passes through it.

Referring to FIG. 1 it will be noted that the portion of the gas produced in Zones #1 and #2, which is not required in Zone #3 or which must be removed through tuyere sets T4 and T5 to prevent an excessive buildup of recycling materials is withdrawn through tuyere set T3. Its temperature is closely controlled and its hydrogen and carbon monoxide content make it an ideal reducing gas to use externally without further processing, (Ref. U.S. Pat. No. 4,381,938) in the dependent zone-controlled molten iron producing blast furnaces 29, as a substitute for a portion of the gas which in conventional practice is generated from the combustion of blast furnace quality coke, or in a Ferrous Oxide Direct Reduction plant 15 the product from which is consumed by an electric arc furnace or oxygen blown converter 27.

In this mode of operation only minor ladle additions are required to produce a basic slag (suitable for manufacturing specification cements). Approximately 400 to 700 pounds of slag is generated per ton of waste charged. Approximately only one half of all the gas generated in the bosh in Zone #2 is required in Zone #3 to convert the carbonaceous portion of the charge to coke or char and either put the other materials into gaseous or vaporized form or preheat them to 1000° C. before they reach Zone #2. When the output from tuyere set T3 is not used as a reducing gas it will be passed through waste heat boiler 13 and trace sulfur removal system 23. The emerging gas is an ideal clean-burning, high-efficiency boiler fuel with a 280–300 Btu/cf. energy content. When it is consumed, e.g., in the Electrical Energy Generation Plant 19, the stack gas composed almost entirely of $CO_2$, $H_2O$ and $N_2$ (no nitrous oxide) is an ideal input into the Blue Green Algae Greenhouse Tank Farm 22 or its components may be separated in the By-products Plant and the $CO_2$ sold in some form or recycled as endothermic input to the converter through tuyere sets T1 or T2 or used in the By-products Plant 18 to synthesize products.

When a pipeline quality gas is desired (400–600 Btu/cf.), all the materials removed through tuyere sets T3, T4 and T5 and the top are delivered to waste heat boilers 11, 12 and 13 and then are sent to the trace sulfur removal system 23. The total gaseous output of the trace sulfur removal system 23 containing products of destructive distillation are sent to the By-products Plant 18, where pipeline quality gas is produced. The liquid output of the trace sulfur removal system 23 is delivered to the Sulfur Products Plant 21. The molten metal formed is removed periodically in the conventional manner and sent to the Foundry 17 where, if necessary, the nonferrous metals are separated before the molten iron is processed to finished products in the Foundry 17 or delivered to the Steel Making Facilities 16.

When the chemically and temperature controlled molten slag is periodically withdrawn it is delivered to the Slag Processing Into Building Materials Unit 20. There any additional chemical additions required to produce specification cement clinkers are stirred into the molten slag before it is cooled and ground into cement, or blown to produce rock wool insulation.

When the objective is a maximum output of clean-burning gases, the converter is operated in Mode #3. The amount of carbonaceous material input at the top 10 is increased. Much of the increase may be of biomass origin. The material flow is the same as when operating in the waste conversion Mode #1. The the top contains more of the materials separated out in the By-products Plant and sent to the Synthetic Rubber, Fiber and Plastics Plant 28.

When the objective is to convert oil shale or oil sands in a desirable manner the converter is operated in Mode #2. The charge at the top 10 is oil shale or oil sands and non-premium coal or coke breeze in a ratio ranging from 0.6 to 1.2 per ton of oil shale or sands. U.S. Pat. No. 4,495,054 called attention to Zimmerman's book "World Resources and Industries" in which he reported that in the U.S. alone, there is one trillon of barrels of kerogen oil recoverable from oil shale. This amount is three times the world's known total crude oil reserves. Kerogen can be refined into fuels which are superior to those made from crude oil. No additional slag-forming components are added, and the large volume of slag produced from the conversion of oil shale or oil sands is acidic. Approximately 70% of the gas generated in Zone #2 is required in Zone #3. The following is a calculated example of this process for extraction of kerogen, gases and other products from oil shale and carbonaceous materials:

TABLE 4

| CHARGE | | PRODUCT | | | |
|---|---|---|---|---|---|
| | lbs | | lbs | cf. | BTU/cf. |
| Oil Shale* | 2,000 | T4, T5 and Top | 1,583 | 28,300 | 500 dry |
| Non-Premium | 1,500 | Gas | | 9,475 | 300 dry |
| Coal | | T3 | 505 | | |
| Commerical | 505 | Kerogen | 228 | | |
| Oxygen | | Light Oil | 19 | | |
| Steam | 445 | Tar | 66 | | |
| | | Pig Iron | 106 | | |
| | | Acidic Slag | 1581 | | |
| | | Na (Metallic) | 52 | | |
| | | K (Metallic) | 12 | | |
| | | Water | 267 | | |
| | | Dust | 31 | | |
| Total | 4,450 | Total | 4,450 | | |

*Based on properties of oil shale from largest U.S. oil shale deposit, Green River Basin - Colorado As the oil shale descends and the outside portion of each piece of shale reaches 480° C. it starts releasing liquid kerogen and expanding 50% by volume. McGraw-Hill Encyclopedia of Science and Technology, D. Van Nostrand Company, Inc., New York, 1976. The design of the improved converter according to the invention accommodates the increase in volume of oil shales, and some coals which may be charged, as they reach their critical temperatures, by gradually increasing the diameter of the stack in the Region 4, which tapers outwardly from the narrowed section 2 at the top. The more central consumption of the carbonaceous grate, achieved by the more central delivery of the oxygen jet blast, also promotes an even downward movement of the burden. As the coal and char forming materials charged at the top descend, the moisture in the charge and the volatile components are driven off and leave the converter through the top. The coke or char remainder moves downward. As the liquid kerogen released in the upper portion of Zone 3 descends it absorbs enough sensible heat from the ascending gas stream to become vaporous and start ascending the stack again. A portion of the ascending gas stream is continuously removed through tuyere sets T4 and T5 carrying with it a major portion of the kerogen vapor. When gas samples taken at these points indicate an undesirable buildup in the stack, additional carbonaceous material is periodically charged and the output through these tuyeres increased to remove it. As the main portion of the gas stream formed in Zone #2 moves up performing the coking process it also preheats approximately 1,500 lbs of acid slag forming constituents produced per ton of oil shale or sands converted.

Other materials that recycle in the stack interfering with the smooth downward movement of the burden and decreasing lining life are Na, K, KCN, NaCN and Zn and P. Most of them are continuously output through Tuyere set T3. When gas analysis shows the need, a periodic purge is made through tuyere sets T3 and T4. The gases removed through tuyere sets T3, T4 and T5 pass through Waste Heat Boilers 12 and 13 and Trace Sulfur Removal System 23 before delivery to the By-products Plant or that from T3 sent elsewhere as desired. The products when removed from the Waste Heat Boilers are be in a liquid (kerogen and water) or dust form.

The iron oxide content of the oil shale is reduced in Zone #3. The reduced oxides and the slag constituents become molten near the top of Zone #2, and trickle down through the carbonaceous grate in Zone #2. They accumulate in the hearth and are periodically withdrawn as in conventional practice. The acidic slag is delivered to the Slag Processing Into Building Materials Unit 20, where it can be poured into igneous rock castings or processed into other building materials.

When it is desired to use a converter to produce molten metal in an improved manner, mode #4 is employed. The charge at the top 10 will contain metallic oxides in various forms. Only approximately ½ of the carbonaceous grate material charged at the top need be premium blast furnace coke with the stability required to resist crushing by a burden heavy with iron or other metallic oxides. The balance of the carbonaceous requirement can be petroleum coke, non-premium coal and optionally some additions of other carbonaceous material. The effectiveness of this smaller amount of premium blast furnace coke is enhanced because of the reduced permeability requirements, (lower volume, no nitrogen in the ascending gas), and other less costly carbonaceous materials provide a major portion of the carbon consumed in producing the process heat and reducing gas required.

The following is a calculated example of the process for molten metals production:

TABLE 5

| CHARGE | | PRODUCT | | | |
|---|---|---|---|---|---|
| | lbs. | | lbs. | cf. | BTU/cf. |
| Coarse Iron Ore | 902 | Pig Iron | 2,000 | — | — |
| Pellets | 1,365 | Slag | 766 | — | — |
| Sinter | 1,182 | Top Gas | 2,851 | 36,738 | 278 |
| "B" Scrap | 100 | Water | 559 | | |
| Bosp Slag | 151 | Dust Loss | 59 | | |

TABLE 5-continued

| CHARGE | | PRODUCT | | |
| --- | --- | --- | --- | --- |
| | lbs. | lbs. | cf. | BTU/cf. |
| Lime Stone | 25 | | | |
| Metallurigical Coke | 600 | | | |
| Form Coke or Pet. Coke | 400 | | | |
| Biomas | 140 | | | |
| Oxygen | 740 | | | |
| Steam (Internally Produced) | 630 | | | |
| TOTAL | 6,235 | TOTAL | 6,235 | |

There are inherent advantages to converting molten metal producing blast furnaces to converters: less premium coke per ton of molten metal, the simultaneous production of a superior top gas, more tons of molten metal per hour longer lining life and the ability to consume tainted water and other endothermic inputs. The end result is a lower cost per ton of molten metal produced and less pollution. It is possible to gain these advantages by installing only the Zone #1 and #2 improvements detailed herein but even when superior raw materials are charged some will contain trace constituents which tend to cause recycling complications and shorten lining life. To gain full advantage, tuyere sets T3, T4 and T5 also need to be installed along with the sensors located at strategic points which input to the process control computer for calculation of the endothermic and exothermic inputs and outputs. When steam is input, the water gas reaction converts it into carbon monoxide and hydrogen. The hydrogen content of the up moving reducing gas stream is increased, resulting in an increased steam and decreased carbon dioxide content in the top gas. In this mode, all gases leave through the top 9, except during periodic short intervals of recycling material removal. After the moisture and the sulfur is removed the fuel gas formed will have an energy content of 280–300 Btu/cf. During brief recycling material purges, gas and vapors are withdrawn through tuyere sets T3, T4 and T5. The process control computer calculates the additional premium blast furnace coke to be charged. The combustion of this coke is required to replace the sensible heat and reducing gas lost to parts of Zone #3 at that time.

When the major objective is to produce electrical energy without polluting land, air or water, the converter is operated in either Mode #1 or Mode #3. The gas withdrawn through tuyere set #3 after going through the Waste Heat Boiler and the Trace Sulfur Removal System is input into an Electrical Energy Generation Plant. The stack effluent from the plant's boiler is input into the By-products Plant. There it is separated into its components: nitrogen, carbon dioxide and water. The $N_2$ and $CO_2$ and $H_2O$ may be sold as products, or the $CO_2$ alternatively may be converted in the By-products Plant to urea then used in the synthesize of fertilizers and other products. An alternate method is to deliver the top gas to a Blue-Green Algae Greenhouse Tank Farm. There the algae in the pond employ photosynthesis to convert the $CO_2$ into a health stimulating plant food and pure $O_2$. Still a further option is to use the $CO_2$ as the endothermic input through tuyere sets T1 or T2 in the converter. Steam from Waste Heat Boilers 11, 12 and 13 is another product sold or used in the Electrical Generation Plant or elsewhere in the "Improved Converter System".

The construction and operation of the converter of this invention employ only conventional materials and techniques and, given the teaching of this specification, are easily within the skill of the art. Similarly, the associated systems and associated devices such as injection devices, temperature, liquid and gas detection and analysis equipment, and the like, are commercially available. Computer control systems are also available or can readily be formulated.

The preferred embodiment of the invention as described in the specification and shown in the drawing is illustrative only. Since modifications will be apparent to those skilled in the art, the invention is limited only by the scope of the appended claims.

We claim:

1. In a blast furnace for processing a charge of material introduced into the top of the blast furnace, the material being heated as it moves downwardly through the widening, tapered stack of the blast furnace, the improvement wherein the stack has a narrowed top section which comprises approximately 15 percent of the stack height above the bosh and has a substantially constant diameter on the order of approximately 75 percent of the diameter that the uppermost portion of the stack would have if the taper of the stack were maintained substantially constant.

2. A blast furnace according to claim 1, wherein the stack has a tapered transition section which interconnects said top section and the remainder of the stack, said transition section comprising approximately 10 percent of the stack height above the bosh.

3. A blast furnace according to claim 2, further comprising five sets of tuyeres, two of said sets of tuyeres being located in the bosh and three of said sets of tuyeres being located in the stack above the bosh.

4. A blast furnace according to claim 3, wherein tuyere set T1 is located in the hearth above where molten slag and metal are allowed to collect, tuyere set T2 is located above tuyere set T1, tuyere set T3 is located above tuyere set T2 and above the mantel, tuyere set T4 is located above the mantel approximately 25 percent of the distance between the mantel and the top of the stack, and tuyere set T5 is located approximately 42 percent of the distance between the mantel and the top of the stack.

5. A blast furnace according to claim 4 including endothermic material injection system located at tuyere set T1 openings and oxygen jet nozzles and an endothermic injection system located at tuyere set T2.

6. A blast furnace according to claim 4 including sensing devices at the top, all five tuyere sets and the crucible to sense temperatures at all locations and obtain gas analysis at tuyere sets T3, T4, and T5 and the top.

7. A method of operating the blast furnace of claim 4 as a converter comprising the steps of:
   a. charging into the top the solid materials to be converted including carbonaceous materials said material moving downwardly through the stack forming a carbonaceous grate in the bosh;
   b. injecting through tuyere sets T1 and T2 all incoming gases, liquids and dusts;
   c. introducing 100% oxygen jet blast streams (with a small peripheral content of endothermic reacting material) through jet nozzles located in tuyere set T2 at a pressure high enough to enable them to penetrate deeply into the bosh in front of tuyere set T2;
   d. combusting in the bosh in front of tuyere set T2 carbon from the carbonaceous grate at high flame temperatures to furnish the process heat required to convert all input materials into a gas, vapor, molten metal, motel slag or dusts;
   e. introducing through tuyere set T1 endothermic reacting materials at a pressure slightly greater than that prevailing in the bosh to maintain a zone controlled temperature profile and create a temperature controlled buffer zone located between the high temperature more central portion of the bosh and the walls in the lower part of the converter to protect the refractories, the tuyeres, and injection systems located there from the high flame temperatures employed in the central portion of the bosh;

f. withdrawing gases, vapors and dusts through tuyere sets T3, T4 and T5 to remove products and by-products and achieve zone control of the converter's temperature profile;

g. withdrawing slag from the lower portion of the converter;

h. withdrawing metal from near the bottom of the converter; and i. regulating the volume of endothermic reacting materials input through tuyere sets T1 and T2 and/or regulating the $O_2$ input through tuyere set T2 to control the temperature in the bosh.

8. The method according to claim 7 wherein gases withdrawn from tuyeres T3, T4 and/or T5 and the top are conducted through waste heat boilers and sulfur removal systems to provide cleaned gases.

9. The method according to claim 9 wherein at least a portion of said cleaned gases are conducted to a synthetic polymer facility.

10. The method according to claim 7 wherein the molten slag is incorporated into building materials.

11. A method according to claim 7 wherein said carbonaceous material comprises non-premium coal and other non-premium carbonaceous materials.

12. A method according to claim 7, further comprising the step of employing a computer using input from sensing equipment located at T3, T4, T5 and the top gaseous stream to regulate the materials injected through tuyere sets T1 and T2 to maintain a temperature controlled protective zone between the high temperature central portion of the bosh and the refractory walls of the converter in the bosh.

13. A method according to claim 7 comprising the steps of:

a. introducing a charge containing oil shales or oil sands in which the carbonaceous material per ton of oil shale or oil sands will be within a ratio of about 0.6 to 1.2;

b. introducing endothermic reacting materials through tuyere set T1;

c. introducing oxygen and an additional peripheral layer of endothermic reacting material through tuyere set T2;

d. burning the carbonaceous grate material in said charge in the central portion of the bosh to produce the heat required to convert the down moving charge to gases, vapors, molten metal, molten slag or dusts and to provide heat for steps "e." and "f";

e. heating the charge near the top of stack, where the reduced diameter of the stack starts to taper to the conventional diameter to not above 480° C. to start releasing liquid kerogen and expanding the oil shale portion of the charge;

f. further heating the charge at the bottom end of stack to approximately 1000° C. to convert the carbonaceous portion of the charge to coke or char and preheat the noncarbonaceous portion of the burden;

g. further heating the down moving charge in the central portion of the bosh high enough to convert it to gases, molten slag, molten metal, vapors or dusts;

h. removing molten metal and molten slag from the crucible;

i. continuously withdrawing gases through tuyere set T3 containing recycling materials;

j. withdrawing useful hydrocarbon gases and kerogen through tuyere sets T4 and T5, and through the top of the stack.

14. The method according to claim 13 wherein at least a portion of the withdrawn cases are conducted to a synthetic polymer plant.

15. The method according to claim 13 wherein the slag is incorporated into building materials.

16. The method according to claim 13 wherein at least a portion of the withdrawn gases is used for fuel.

17. A method according to claim 7 to convert municipal and/or industrial wastes having a metallic content into useful byproducts, the method comprising the steps of:

a. introducing a charge containing said wastes, carbonaceous material and slag-forming constituents into the top of the furnace;

b. introducing endothermic reacting materials through tuyere set T1;

c. introducing oxygen through tuyere set T2;

d. burning the carbonaceous material in said charge in the central portion of the bosh to melt slag therein and to provide heat for step (e);

e. heating the charge in the stack to approximately 1,000° C. to convert the carbonaceous portion of the charge to coke or char and convert the noncarbonaceous portion to gases, vapors and molten materials;

f. removing molten metal and molten slag from the crucible;

g. withdrawing useful gases through tuyere set T3 having an energy content of 280 to 300 Btu/cf; and h. withdrawing useful gases through tuyere sets T4 and T5, and through the top of the stack.

18. The method of claim 17 wherein at least a portion of the withdrawn gases is used for fuel.

19. The method of claim 7 wherein the charge at the top of the converter contains metallic oxides.

20. The method of claim 7 wherein carbonaceous material of biomass origin is input to the top of the converter.

* * * * *

UNITED STATES PATENT AND TRADEMARK OFFICE
CERTIFICATE OF CORRECTION

PATENT NO.: 6,030,430
DATED: February 29, 2000
INVENTOR(S): H. Bruce CLAFLIN, et al.

It is certified that these errors appear in the above-identified patent and that said Letters Patent is hereby corrected as shown below:

Column 2, line 29,
"qualify" has been replaced with --quality--.

Column 9, Table 4, line 42,
"9,475 300 dry" has been deleted after "Gas"

column 9, Table 4, line 43,
after "T3" --9,475 300 dry-- has been inserted.

Signed and Sealed this

Fifteenth Day of May, 2001

Attest:

NICHOLAS P. GODICI

Attesting Officer     Acting Director of the United States Patent and Trademark Office